(12) United States Patent
Zhao et al.

(10) Patent No.: US 12,061,698 B2
(45) Date of Patent: Aug. 13, 2024

(54) METHOD AND DEVICE FOR DETERMINING MALICIOUS FILE

(71) Applicant: Hillstone Networks Co., Ltd., Jiangsu (CN)

(72) Inventors: Ye Zhao, Jiangsu (CN); Wei Yuan, Jiangsu (CN); Peng Lu, Jiangsu (CN); Haixu Wang, Jiangsu (CN)

(73) Assignee: Hillstone Networks Co., Ltd., Jiangsu (CN)

( * ) Notice: Subject to any disclaimer, the term of this patent is extended or adjusted under 35 U.S.C. 154(b) by 0 days.

(21) Appl. No.: 17/439,827

(22) PCT Filed: Aug. 20, 2020

(86) PCT No.: PCT/CN2020/110318
§ 371 (c)(1),
(2) Date: Sep. 16, 2021

(87) PCT Pub. No.: WO2022/021501
PCT Pub. Date: Feb. 3, 2022

(65) Prior Publication Data
US 2023/0153432 A1 May 18, 2023

(30) Foreign Application Priority Data
Jul. 30, 2020 (CN) .......................... 202010754323.5

(51) Int. Cl.
*G06F 21/55* (2013.01)
*G06F 21/56* (2013.01)
(Continued)

(52) U.S. Cl.
CPC .......... *G06F 21/564* (2013.01); *H04L 63/168* (2013.01)

(58) Field of Classification Search
None
See application file for complete search history.

(56) References Cited

U.S. PATENT DOCUMENTS

| 2015/0288707 A1 | 10/2015 | Liu |
| 2018/0101682 A1 | 4/2018 | Krukov et al. |

(Continued)

FOREIGN PATENT DOCUMENTS

| CN | 102663281 A | 9/2012 |
| CN | 103810247 A | 5/2014 |

(Continued)

OTHER PUBLICATIONS

Finding Diversity in Remote Code Injection Exploits. Ma. ACM. (Year: 2006).*

(Continued)

*Primary Examiner* — Venkat Perungavoor
(74) *Attorney, Agent, or Firm* — Samson G. Yu

(57) ABSTRACT

This application discloses a method and device for determining a malicious file. The method includes: whether a plurality of received file blocks meet a preset condition is judged. Herein, the plurality of file blocks are file blocks of a file to be detected, and the preset condition at least includes: a size condition of each of the plurality of file blocks and a sorting condition of each of the plurality of file blocks. When the plurality of file blocks do not meet the preset condition, a Hash eigenvalue of at least one header file block is calculated, wherein the at least one header file block is at least one file block cached in a device cache area according to the order of the file blocks. The plurality of file blocks are divided into subfiles with a preset quantity, and the Hash eigenvalue unrelated to the order of each subfile is calculated. Whether or not the file to be detected is the malicious file is judged based on the Hash eigenvalue of the at least one header file block and the Hash eigenvalue unrelated to the order of each subfile. Through this application, the problem that the file to be detected is difficult to be detected as the malicious file when the device has no (Continued)

enough space to cache all file blocks of the file to be detected in the related art is solved.

15 Claims, 3 Drawing Sheets

(51) Int. Cl.
*G06F 21/60* (2013.01)
*H04L 9/40* (2022.01)
*G06F 21/64* (2013.01)

(56) References Cited

U.S. PATENT DOCUMENTS

| | | | |
|---|---|---|---|
| 2019/0080089 A1* | 3/2019 | Chen | G06N 20/10 |
| 2023/0155822 A1* | 5/2023 | Chen | H04B 10/70 |
| | | | 257/14 |
| 2023/0273291 A1* | 8/2023 | Ozturk | G01S 7/415 |
| | | | 342/52 |

FOREIGN PATENT DOCUMENTS

| | | |
|---|---|---|
| CN | 106777388 A | 5/2017 |
| CN | 108566372 A | 9/2018 |
| CN | 110659484 A | 1/2020 |
| CN | 110704383 A | 1/2020 |
| CN | 110955893 A | 4/2020 |
| CN | 110995679 A | 4/2020 |

OTHER PUBLICATIONS

A Comparative Evaluation of Anomaly Detectors under Portscan Attacks. Ashtaq. Springer-Verlag. (Year: 2008).*
A Detection Method for Android Repackaged Applications with Malicious Features Similarity of Family Homology. Liao. IEEE. (Year: 2017).*
International Search Report for corresponding application PCT/CN2020/110318 filed Aug. 20, 2020; Mail date Apr. 25, 2021.

* cited by examiner

METHOD AND DEVICE FOR DETERMINING MALICIOUS FILE

CROSS-REFERENCE TO RELATED APPLICATION

The disclosure claims priority to Chinese patent application No. 202010754323.5, filed on Jul. 30, 2020 and entitled "Method and Device for Determining Malicious File", the disclosure of which is hereby incorporated by reference in its entirety.

TECHNICAL FIELD

This application relates to the field of information processing technologies, in particular to a method and device for determining a malicious file.

BACKGROUND

The malicious file detection technology is widely applied in the current network security device. Usually, a file bearing layer protocol (for example, Server Message Block (SMB) protocol) decoder in the network security device extracts file contents from flow and calculates a checksum, which is compared with that of a pre-generated malicious file, and when a match is found, the file is judged whether or not to be a malicious file. In the solution of the related art, steps of judging the malicious file are as follows: firstly, an engine is detected and gradually decoded layer by layer according to the protocol, and then a file block is extracted. A Hash eigenvalue of the block is calculated according to the order of the file block, and then the Hash eigenvalue of the whole file is obtained after the file is received. Then the Hash eigenvalue of the whole file is used to query a feature library of the Hash eigenvalue of the malicious file, to determine whether or not the Hash eigenvalue is the same as the known Hash eigenvalue result of the malicious file in the library, and then determine whether or not the file is the malicious file.

However, an algorithm for calculating the Hash eigenvalue of the malicious file in the Industry (for example, Message Digest 5 (MD5)) is required to be executed in a case that the file block is in order, and the Hash eigenvalue cannot be calculated in a case that a file data block is out of order, so that the malicious file is detected. When the file is out of order, an intermediate network security device can calculate the Hash eigenvalue in the worst case that all file blocks need to be cached, so requirements on memory space of the device are too high. When the device has no enough space to cache the file block, a result that an in-order calculation of the Hash eigenvalue result cannot be completed is caused, and detection for a greater malicious file cannot be implemented.

For a problem that a file to be detected is difficult to be detected as a malicious file when the device has no enough space to cache all file blocks of the file to be detected in the related art, no effective solution has been proposed at present.

SUMMARY

The main purpose of this application is to provide a method and device for determining a malicious file to solve a problem that a file to be detected is difficult to be detected as a malicious file when the device has no enough space to cache all file blocks of the file to be detected in the related art.

In order to implement the above purpose, according to one aspect of this application, a method for determining a malicious file is provided. The method includes: whether or not a plurality of received file blocks meet a preset condition is judged. Herein, the plurality of file blocks are file blocks of a file to be detected, wherein the preset condition at least includes: a size condition of each of the plurality of file blocks and a sorting condition of each of the plurality of file blocks. When the plurality of file blocks do not meet the preset condition, the Hash eigenvalue of at least one header file block is calculated, and the at least one header file block is a file block cached in a device cache area according to the order of the file blocks. The plurality of file blocks are divided into subfiles with a preset quantity, and the Hash eigenvalue unrelated to the order of each subfile is calculated. Whether or not the file to be detected is the malicious file is judged based on the Hash eigenvalue of the at least one header file block and the Hash eigenvalue unrelated to the order of each subfile.

Further, the Hash eigenvalue unrelated to the order of each subfile is calculated, including: each subfile is divided into a plurality of data blocks with preset bit, and the Hash eigenvalue unrelated to the order in each data block with the preset bit is calculated. The Hash eigenvalue unrelated to the order in each data block with the preset bit is accumulated and calculated to obtain the Hash eigenvalue unrelated to the order of each subfile.

Further, the method further includes: when the size of the data block less than the preset bit exists in the data block divided by each subfile, the data block less than the preset bit is filled to adjust each data block to be the data block with the preset bit.

Further, whether or not the file to be detected is the malicious file is judged based on the Hash eigenvalue of the at least one header file block and the Hash eigenvalue unrelated to the order of each subfile, including: the length of the file to be detected is obtained. Matching query is performed in a preset database according to the length of the file to be detected, the Hash eigenvalue of the header file block and the Hash eigenvalue unrelated to the order of each subfile to determine whether or not the file to be detected is the malicious file.

Further, the matching query is performed in the preset database according to the length of the file to be detected, the Hash eigenvalue of the header file block and the Hash eigenvalue unrelated to the order of each subfile to determine whether or not the file to be detected is the malicious file, including: when the length, the Hash eigenvalue of the header file block and the Hash eigenvalue unrelated to the order of each subfile of the data information stored in the preset database are the same as the file to be detected, the file to be detected is determined as the malicious file.

Further, before judging whether the plurality of file blocks received is to meet the preset condition, the method further includes: the size of the file to be detected is judged. When the size of the file to be detected exceeds a preset size, a step of judging whether or not the plurality of file blocks received is to meet the preset condition is executed.

Further, the method is applied to a scene that the data block of the file to be detected is obtained in application layer protocol disordered transmission of a network security device.

In order to implement the above purpose, according to one aspect of this application, a device for determining a malicious file is provided. The device includes a first judgment unit, a first calculation unit, a second calculation unit and a second judgment unit. The first judgment unit is configured to judge whether a plurality of file blocks received meet a preset condition, wherein the plurality of file blocks are file blocks of the file to be detected, and the preset condition at least includes: a size condition of each of the plurality of file blocks and a sorting condition of each of the plurality of file blocks. The first calculation unit is configured to calculate a Hash eigenvalue of at least one header file block in a case that the plurality of file blocks do not meet the preset condition, and the header file block is a file block that has been cached in a device cache area according to the order of the file blocks. The second calculation unit is configured to divide the plurality of file blocks into subfiles with a preset quantity, and calculate the Hash eigenvalue unrelated to the order of each subfile. The second judgment unit is configured to judge whether or not the file to be detected is the malicious file based on the Hash eigenvalue of the at least one header file block and the Hash eigenvalue unrelated to the order of each subfile.

In order to implement the above purpose, according to one aspect of this application, a non-volatile storage medium is provided, wherein the storage medium includes a stored program, which executes any one of the above method for determining the malicious file.

In order to implement the above purpose, according to one aspect of this application, a processor is provided, wherein the processor is configured to run a program. When running, the program executes any one of the above method for determining the malicious file.

Through this application, the following steps are adopted: whether a plurality of file blocks received meet a preset condition is judged. Herein, the plurality of file blocks are file blocks of a file to be detected, and the preset condition at least includes: a size condition of each of the plurality of file blocks and a sorting condition of each of the plurality of file blocks. When the plurality of file blocks do not meet the preset condition, the Hash eigenvalue of a header file block is calculated, and the header file block is at least one file block cached in a device cache area according to the order of the file blocks. The plurality of file blocks are divided into subfiles with a preset quantity, and the Hash eigenvalue unrelated to the order of each subfile is calculated. Whether or not the file to be detected is the malicious file is judged based on the Hash eigenvalue of the at least one header file block and the Hash eigenvalue unrelated to the order of each subfile, and then the problem that a file to be detected is difficult to be detected as a malicious file when the device has no enough space to cache all file blocks of the file to be detected in the related art is solved. Whether or not the file to be detected is the malicious file is judged according to the Hash eigenvalue of the file block cached according to the order of the file block and the Hash eigenvalue unrelated to the order of each subfile, and then it is possible to detect whether or not the file to be detected is the malicious file in a case that the device has no enough space to cache all file blocks of the file to be detected.

BRIEF DESCRIPTION OF THE DRAWINGS

The drawings, which constitute a part of this application, are used to provide a further understanding of this application, and the exemplary embodiments of this application and the description thereof are used to explain this application, but do not constitute improper limitations to this application. In the drawings.

DETAILED DESCRIPTION OF THE EMBODIMENTS

It is to be noted that embodiments in this application and features in the embodiments may be combined with each other without conflict. This application will be described below in detail with reference to drawings and in combination with the embodiments.

In order to make those skilled in the art understand the solutions of this application better, the technical solutions in the embodiments of this application are clearly and completely elaborated below in combination with the drawings in the embodiments of this application. It is apparent that the described embodiments are only a part of the embodiments of this application but not all. Based on the embodiments of this application, all the other embodiments obtained by those of ordinary skill in the art on the premise of not contributing creative effort should belong to the protection scope of this application.

It should be noted that terms "first", "second" and the like in the description, claims and the abovementioned drawings of this application are adopted not to describe a specific order but to distinguish similar objects. It should be understood that the terms used in such a way may be exchanged where appropriate, in order that the embodiments of this application can be described here. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices.

For convenient description, some of the terms or terms involved in the embodiments of this application are described below.

Malicious file: for example, the malicious file is a script, such as a virus, Trojan horse and the like to destroy a computer system or steal user privacy.

According to embodiments of this application, a method for determining a malicious file is provided.

Figure 1:
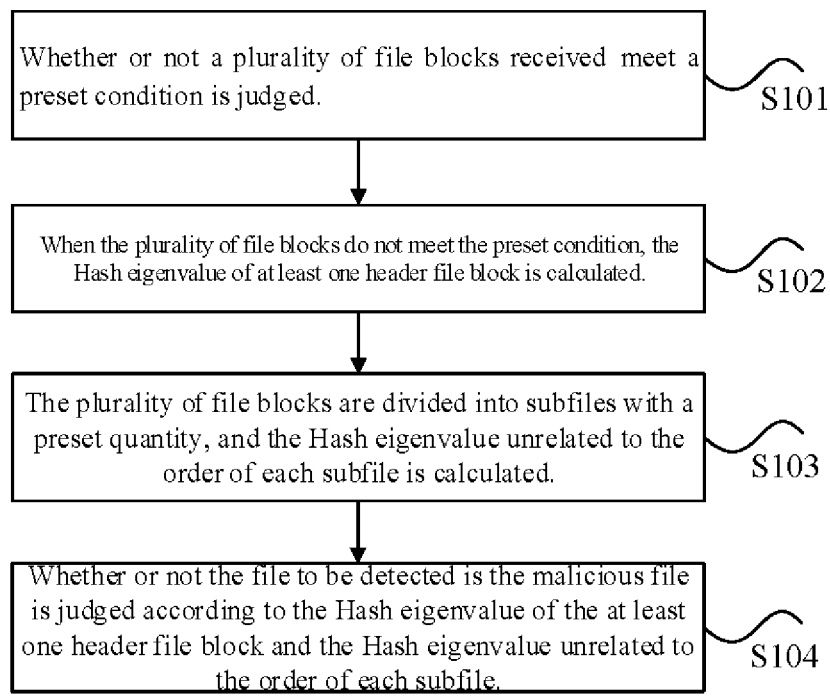
FIG. 1 is a flowchart of a method for determining a malicious file according to embodiments of this application.

FIG. 1 is a flowchart of a method for determining a malicious file according to embodiments of this application. As shown in FIG. 1, the method includes the following steps.

At S101, whether or not a plurality of file blocks received meet a preset condition is judged. Herein, the plurality of file blocks are file blocks of a file to be detected, and the preset condition at least includes: a size condition of each of the plurality of file blocks and a sorting condition of each of the plurality of file blocks.

At S102, when the plurality of file blocks do not meet the preset condition, the Hash eigenvalue of at least one header file block is calculated, and the header file block is at least one file block cached in a device cache area according to the order of the file blocks.

Figure 2:
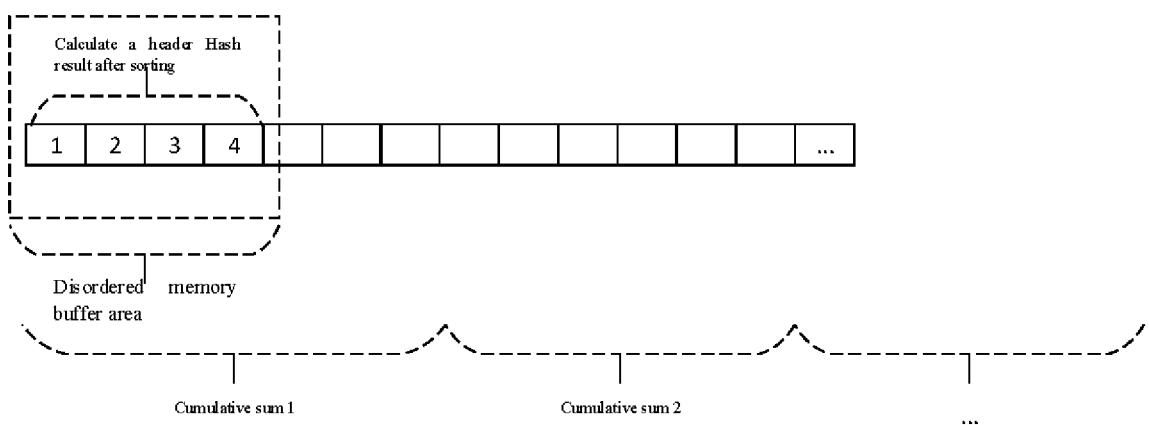
FIG. 2 is a calculation schematic diagram of supplementary features in a method for determining a malicious file according to embodiments of this application.

When the size of all file blocks of the file to be detected exceeds a preset size and the file blocks are not arranged according to the order, the file blocks of the file to be detected are regarded as not meet the preset condition. For example, the upper limit of the device cache area is 2M, the size of all file blocks of the obtained file to be detected is also 5M, namely, the size of the file to be detected exceeds 2M, the file blocks are not arranged according to the order, and the Hash eigenvalue of the file blocks cached in the device cache area according to the order of the file blocks are calculated. As shown in FIG. 2, the part in a dotted box is the file blocks cached in the device cache area according to the order of the file blocks, the file blocks cached according to the order of the file blocks are sorted, and then the Hash eigenvalue of the sorted file blocks in the device cache area is calculated (calculate a header Hash result after corresponding to the sorting in FIG. 2)

At S103, the plurality of file blocks are divided into subfiles with a preset quantity, and the Hash eigenvalue unrelated to the order of each subfile is calculated.

It should be noted that, in addition to saving the feature definition of the original malicious file, the supplementary to the malicious file of which the size of the file to be detected exceeds a preset size threshold value (for example, the buffer upper limit of the detection device is 2M) is as shown in Table 1 below. The file header Hash value (the Hash eigenvalue of the file blocks cached in the device cache area according to the order of the file block) and a file cumulative sum (the Hash eigenvalue unrelated to the order of each subfile) are used as second file features, and the supplemented file feature may be configured to independently recognize the malicious file.

TABLE 1

| File header Hash value | File cumulative sum |
| --- | --- |
| File header Hash value (according to the buffer upper limit of the device, for example, Hash value calculated by 2M). | Some cumulative sums (for example, overall cumulative sum, and 10M cumulative sum) |

Optionally, in the method for determining the malicious file provided by the embodiments of this application, the Hash eigenvalue unrelated to the order of each subfile is calculated, including: each subfile is divided into a plurality of data blocks with preset bit, and the Hash eigenvalue unrelated to the order in each data block with the preset bit is calculated. The Hash eigenvalue unrelated to the order in each data block with the preset bit is accumulated and calculated to obtain the Hash eigenvalue unrelated to the order of each subfile.

It should be noted that an algorithm for calculating the Hash eigenvalue unrelated to the order in the data block may participate in calculating in any order for a data unit input into the data block, and the obtained result is the same, for example, the algorithm for calculating the Hash eigenvalue unrelated to the order is a cumulative sum.

For example, the size of the file to be detected is 10M, the device cache area can cache 1M of data, so that 10M is divided into 5 subfiles. 0-2M is the first subfile, which is a 64-bit data block. It is divided into 8 bit data blocks to obtain eight 8 bit data blocks. The Hash eigenvalue of each 8 bit data block are calculated. The Hash eigenvalue of eight 8 bit data blocks are accumulated and calculated to obtain the Hash eigenvalue unrelated to the order of 0-2M file. The method for calculating the Hash eigenvalue of 2-4M subfile, 4-6M subfile, 6-8M subfile and 8-10M subfile are the same as that for calculating the Hash eigenvalue of 0-2M subfile. No details are made herein. A diagram for calculating the file header Hash value (the Hash eigenvalue of the file blocks cached in the device cache area according to the order of the file) and the file cumulative sum (the Hash eigenvalue unrelated to the order of each subfile) as shown in Table 2 below.

TABLE 2

| File header Hash value | File overall Hash value |
| --- | --- |
| Hash value of front 1M data of the file | Cumulative sum 1 (64 bit cumulative sum of 0-2M) |
| | Cumulative sum 2 (64 bit cumulative sum of 2-4M) |
| | Cumulative sum 3(64 bit cumulative sum of 4-6M) |
| | Cumulative sum 4 (64 bit cumulative sum of 6-8M) |
| | Cumulative sum 5 (64 bit cumulative sum of 8-10M) |

At S104, whether or not the file to be detected is the malicious file is judged based on the Hash eigenvalue of the at least one header file block and the Hash eigenvalue unrelated to the order of each subfile.

For example, whether or not the file to be detected is the malicious file is determined through six values (file header Hash value, cumulative sum 1 . . . cumulative sum 5) in Table 2.

Through the above steps, it is possible to detect whether or not the file to be detected is the malicious file in a case that the device has no enough space to cache all file blocks of the file to be detected.

Optionally, in the method for determining the malicious file provided by the embodiments of this application, the method further includes: when the size of the data block less than the preset bit exists in the data divided by each subfile, the data block less than the preset bit is filled to adjust each data block to be the data block with the preset bit.

For example, the preset bit is 64 bit, however, the tail in 8-10M data block is less than 64 bit, the tail is 58 bit, 0 may be filled to complement 64 bit, so that the accuracy for subsequently calculating the Hash eigenvalue of each data block is ensured, and the malicious file is accurately recognized.

In order improve the efficiency for determining whether or not the file to be detected is the malicious file, optionally, in the method for determining the malicious file provided by the embodiments of this application, whether or not the file to be detected is the malicious file is judged based on the Hash eigenvalue of the at least one header file block and the Hash eigenvalue unrelated to the order of each subfile, including: the length of the file to be detected is obtained. Matching query is performed in a preset database based on the length of the file to be detected, the Hash eigenvalue of the header file block and the Hash eigenvalue unrelated to the order of each subfile to determine whether or not the file to be detected is the malicious file.

In the above solution, the length of all malicious files in historical data, the Hash eigenvalue of the file blocks capable of being cached in the device cache area and the Hash eigenvalue unrelated to the order of each subfile are pre-stored in the preset database. The matching query is performed in the preset database directly based on the obtained length of the file to be detected, the length of the file to be detected, the Hash eigenvalue of the header file block and the Hash eigenvalue unrelated to the order of each subfile to quickly determine whether or not the file to be detected is the malicious file. Specifically, when the length, the Hash eigenvalue of the header file block and the Hash eigenvalue unrelated to the order of each subfile of the data information stored in the preset database are the same as the file to be detected, the file to be detected is determined as the malicious file.

Optionally, in the method for determining the malicious file provided by the embodiments of this application, the method is applied to a scene that the data block of the file to be detected is obtained in application layer protocol disordered transmission (for example, Server Message Block (SMB)) of a network security device.

While sending the file, SMB cannot ensure that the file is in order, therefore, the detection for the malicious file may be implemented through the above methods. Before detection, the size of the file to be detected is judged. When the size of the file to be detected exceeds a preset size, a step of judging whether or not the plurality of file blocks received meet the preset condition is executed. Namely, if the size of the transmission file is known in advance, in the method for determining the malicious file provided by the embodiments of this application, only the file to be detected exceeding the preset size is applied to the method for determining the malicious file provided by the embodiments of this application.

Figure 3:
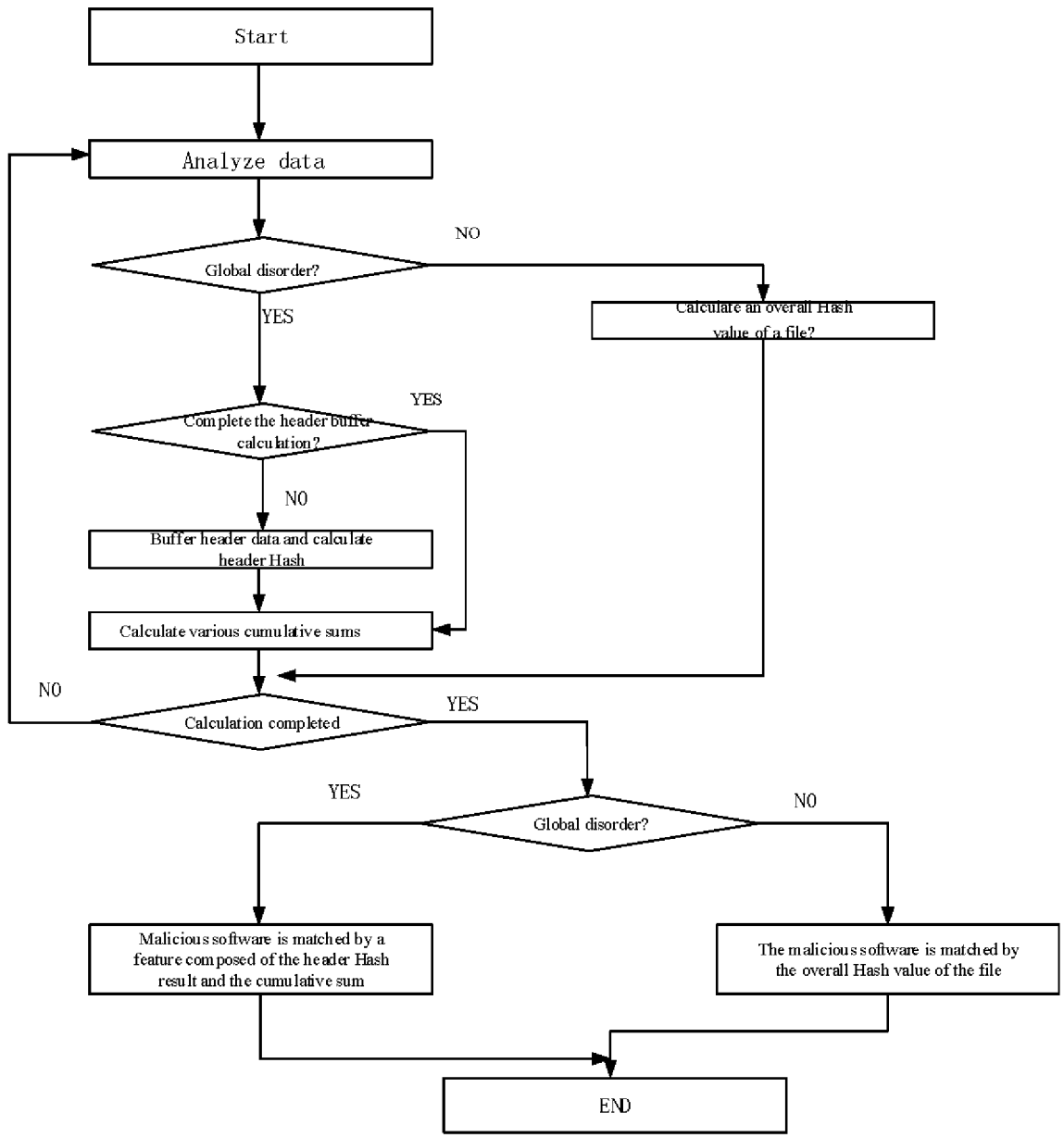
FIG. 3 is a schematic diagram of a method for determining a malicious file according to embodiments of this application.

As shown in FIG. 3, when receiving the plurality of file blocks, data analysis is performed to judge whether the file blocks are global out-of-sequence. It should be noted that the global out-of-sequence means a condition that the plurality of file blocks of the file to be detected cannot be orderly cached. When the plurality of file blocks cannot be orderly cached, the file in the cache area is judged as the global out-of-sequence. And then the Hash eigenvalue of the file blocks (header file blocks) cached in the cache area according to the order of the file block is calculated. The file blocks stored in the cache area may be received for many times, therefore whether the Hash eigenvalue of the file blocks (header file blocks) cached in the cache area according to the order of the file blocks are judged. When the calculation is completed, the cumulative sum of each subfile is calculated. When the calculation is not completed, the cumulative sum of each subfile is calculated after the Hash eigenvalue of the file blocks (header file blocks) cached in the cache area according to the order of the file block is calculated. When the plurality of file blocks can be orderly cached, namely, the files in the cache area can be orderly cached, the Hash eigenvalue of the whole file is calculated. The malicious file judgement on the file to be detected is to further judge whether the plurality of file blocks cannot be orderly cached. If so, whether or not the file to be detected is the malicious file is determined by the features composed of the header Hash eigenvalue and the cumulative sum. If not, whether or not the file to be detected is the malicious file is determined by the calculated Hash eigenvalue of the overall file.

Through the above method, the problem that the file to be detected is difficult to be detected as the malicious file when the device has no enough space to cache all file blocks of the file to be detected in the related art is solved. Whether or not the file to be detected is the malicious file is determined according to the Hash eigenvalue of the file block cached according to the order of the file block and the Hash eigenvalue unrelated to the order of each subfile, and then it is possible to detect whether or not the file to be detected is the malicious file in a case that the device has no enough space to cache all file blocks of the file to be detected.

It should be noted that the steps presented in the flowchart of the drawings can be executed in a computer system like a group of computer executable instructions, and moreover, although a logical order is shown in the flow chart, in some cases, the presented or described steps can be performed in an order different from that described here.

The embodiments of this application provide a device for determining a malicious file. It should be noted that the device for determining the malicious file provided by the embodiments of this application may be configured to execute the device for determining the malicious file provided by the embodiments of this application. The device for determining the malicious file provided by the embodiments of this application is described in details below.

Figure 4:
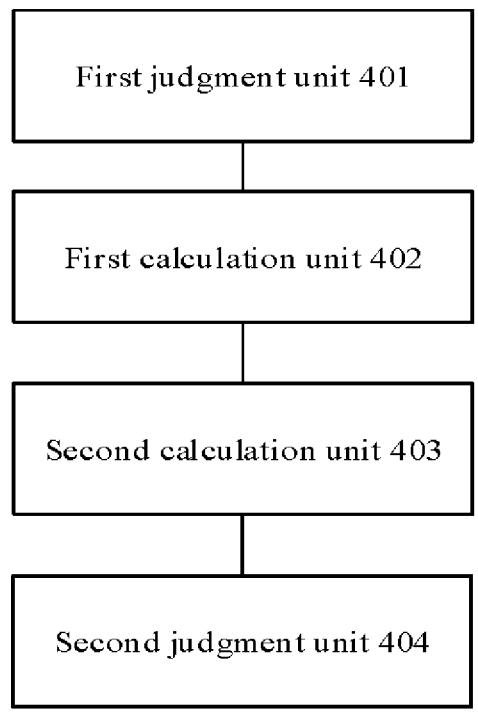
FIG. 4 is a schematic diagram of a device for determining a malicious file according to embodiments of this application.

FIG. 4 is a schematic diagram of a device for determining a malicious file according to embodiments of this application. As shown in FIG. 4, the device includes a first judgment unit 401, a first calculation unit 402, a second calculation unit 403 and a second judgment unit 404.

Specifically, the first judgment unit 401 is configured to judge whether a plurality of file blocks received meet a preset condition, wherein the plurality of file blocks are file blocks of the file to be detected, and the preset condition at least includes: a size condition of each of the plurality of file blocks and a sorting condition of each of the plurality of file blocks.

The first calculation unit 402 is configured to calculate a Hash eigenvalue of at least one header file block in a case that the plurality of file blocks do not meet the preset condition, and the header file block is a file block that has been cached in a device cache area according to the order of the file blocks.

The second calculation unit 403 is configured to divide the plurality of file blocks into subfiles with a preset quantity, and calculate the Hash eigenvalue unrelated to the order of each subfile.

The second judgment unit 404 is configured to judge whether or not the file to be detected is the malicious file based on the Hash eigenvalue of the at least one header file block and the Hash eigenvalue unrelated to the order of each subfile.

According to the device for determining the malicious file provided by the embodiments of this application, the first judgment unit 401 is configured to judge whether a plurality of file blocks received meet a preset condition, wherein the plurality of file blocks are file blocks of the file to be detected, and the preset condition at least includes: a size condition of each of the plurality of file blocks and a sorting condition of each of the plurality of file blocks. The first calculation unit 402 is configured to calculate a Hash eigenvalue of at least one header file block in a case that the plurality of file blocks do not meet the preset condition, and the header file block is a file block that has been cached in a device cache area according to the order of the file blocks. The second calculation unit 403 is configured to divide the plurality of file blocks into subfiles with a preset quantity, and calculate the Hash eigenvalue unrelated to the order of each subfile. The second judgment unit 404 is configured to judge whether or not the file to be detected is the malicious file based on the Hash eigenvalue of the at least one header file block and the Hash eigenvalue unrelated to the order of each subfile. Whether or not the file to be detected is the malicious file is judged according to the Hash eigenvalue of the file block cached according to the order of the file block and the Hash eigenvalue unrelated to the order of each subfile, and then it is possible to detect whether or not the file to be detected is the malicious file in a case that the device has no enough space to cache all file blocks of the file to be detected.

Optionally, in the method for determining the malicious file provided by the embodiments of this application, the second calculation unit 403 includes a first calculating module and a second calculating module. The first calculating module is configured to divide each subfile into a plurality of data blocks with preset bit and calculate the Hash eigenvalue unrelated to the order of in the data block with the preset bit. The second calculating module is configured to accumulate and calculate the Hash eigenvalue unrelated to the order in each data block with the preset bit to obtain the Hash eigenvalue unrelated to the order of each sub file.

Optionally, in the method for determining the malicious file provided by the embodiments of this application, the device further includes a filling unit, which is configured to fill the data block with less bit than the preset bit to adjust each data block to be the data block with the preset bit when the size of the data block less than the preset bit exits in the data block divided by each subfile.

Optionally, in the method for determining the malicious file provided by the embodiments of this application, the second judgment unit 404 includes an obtaining module and a querying module. The obtaining module is configured to obtain the length of the file to be detected. The querying module is configured to perform matching query in the preset database according to the length of the file to be detected, the Hash eigenvalue of the header file block and the Hash eigenvalue unrelated to the order of each subfile to determine whether or not the file to be detected is the malicious file.

Optionally, in the method for determining the malicious file provided by the embodiments of this application, the querying module includes a determining module, which is configured to determine whether or not the file to be detected is the malicious file when the length, the Hash eigenvalue of the header file block and the Hash eigenvalue unrelated to the order of each subfile of the data information stored in the preset database are the same as the file to be detected.

Optionally, in the method determining for the malicious file provided by the embodiments of this application, the device further includes a third judging module and an execution unit. The third judging unit is configured to judge the size of the file to be detected before judging whether or not the plurality of file blocks received meet the preset condition. The execution unit is configured to execute the step of judging whether or not the plurality of file blocks received meet the preset condition in a case that the size of the file to be detected exceeds a preset size.

Optionally, in the method for determining the malicious file provided by the embodiments of this application, the device is applied to a scene that the data block of the file to be detected is obtained in application layer protocol disordered transmission of a network security device.

The method for determining the malicious file includes a processor and a memory. The above mentioned first judgment unit 401, the second calculation unit 402, the second calculation unit 403 and the second judgment unit 404 are stored in the memory as program units, and the above mentioned program units stored in the memory are executed by the processor so as to implement the corresponding function.

The processor includes a kernel, which can call the corresponding program unit in the memory. One or more kernels may be set, when the device has no enough space to cache all file blocks of the file to be detected, it may be possible to detect whether or not the file to be detected is the malicious file through adjusting the kernel parameters.

The memory may include forms of a volatile memory in a computer-readable medium, a Random Access Memory (RAM) and/or a volatile memory and the like, such as a Read-Only Memory (ROM) or a flash RAM), and the memory includes at least one storage chip.

The embodiments of the disclosure provide a storage medium, wherein the storage medium stores a stored program. When executed by the processor, the program implements the method for determining the malicious file.

The embodiments of the disclosure provide a processor, which is configured to run a program. When running, the program executes the method for determining the malicious file.

The embodiments of the disclosure provide a device, which includes a processor, a memory and a program stored on the memory and being capable of running on the processor. When the processor executes the program, the following steps are implemented: whether or not a plurality of file blocks received meet a preset condition is judged. Herein, the plurality of file blocks are file blocks of a file to be detected, and the preset condition at least includes: a size condition of each of the plurality of file blocks and a sorting condition of each of the plurality of file blocks. When the plurality of file blocks do not meet the preset condition, the Hash eigenvalue of at least one header file block is calculated, and the at least one header file block is a file block cached in a device cache area according to the order of the file blocks. The plurality of file blocks are divided into subfiles with a preset quantity, and the Hash eigenvalue unrelated to the order of each subfile is calculated. Whether or not the file to be detected is the malicious file is judged based on the Hash eigenvalue of the at least one header file block and the Hash eigenvalue unrelated to the order of each subfile.

When executing the program, the processor further includes the following steps: the Hash eigenvalue unrelated to the order of each subfile is calculated, including: each subfile is divided into a plurality of data blocks with preset bit, and the Hash eigenvalue unrelated to the order in each data block with the preset bit is calculated. The Hash eigenvalue unrelated to the order in each data block with the preset bit is added and calculated to obtain the Hash eigenvalue unrelated to the order of each subfile.

When executing the program, the processor further includes the following steps: the method further includes: when the size of the data block less than the preset bit exists in the data divided by each subfile, the data block less than the preset bit is filled to adjust each data block to be the data block with the preset bit.

When executing the program, the processor further includes the following steps: whether or not the file to be detected is the malicious file is judged based on the Hash eigenvalue of the at least one header file block and the Hash eigenvalue unrelated to the order of each subfile, including: the length of the file to be detected is obtained. Matching query is performed in a preset database according to the length of the file to be detected, the Hash eigenvalue of the header file block and the Hash eigenvalue unrelated to the order of each subfile to determine whether or not the file to be detected is the malicious file.

When executing the program, the processor further includes the following steps: the matching query is performed in the preset database according to the length of the file to be detected, the Hash eigenvalue of the header file block and the Hash eigenvalue unrelated to the order of each subfile to determine whether or not the file to be detected is the malicious file, including: when the length, the Hash eigenvalue of the header file block and the Hash eigenvalue unrelated to the order of each subfile of data information stored in the preset database are the same as the file to be detected, the file to be detected is determined as the malicious file.

When executing the program, the processor further includes the following steps: before judging whether or not the plurality of file blocks received meet the preset condition, the method further includes: the size of the file to be detected is judged. When the size of the file to be detected exceeds a preset size, a step of judging whether or not the plurality of file blocks received meet the preset condition is executed.

When executing the program, the processor further includes the following steps: the method is applied to a scene that the data block of the file to be detected is obtained in application layer protocol disordered transmission of a network security device. The device herein may be a server, a Personal Computer (PC), a pad, a mobile phone, etc.

This application further provides a computer program product, which is suitable for executing the initialized program in following method steps when being executed on a data processing device: whether or not a plurality of file blocks received meet a preset condition is judged. Herein, the plurality of file blocks are file blocks of a file to be detected, and the preset condition at least includes: a size condition of each of the plurality of file blocks and a sorting condition of each of the plurality of file blocks. When the plurality of file blocks do not meet the preset condition, the Hash eigenvalue of at least one header file block is calculated, and the at least one header file block is a file block cached in a device cache area according to the order of the file blocks. The plurality of file blocks are divided into subfiles with a preset quantity, and the Hash eigenvalue unrelated to the order of each subfile is calculated. Whether or not the file to be detected is the malicious file is judged based on the Hash eigenvalue of the at least one header file block and the Hash eigenvalue unrelated to the order of each subfile.

When executing on the data processing device, the computer program product is also suitable for executing the initialized program in following method steps: the Hash eigenvalue unrelated to the order of each subfile is calculated, including: each subfile is divided into a plurality of data blocks with preset bit, and the Hash eigenvalue unrelated to the order in each data block with the preset bit is calculated. The Hash eigenvalue unrelated to the order in each data block with the preset bit is accumulated and calculated to obtain the Hash eigenvalue unrelated to the order of each subfile.

When executing on the data processing device, the computer program product is also suitable for executing the initialized program in following method steps: the method further includes: when the size of the data block less than the preset bit exists in the data divided by each subfile, the data block less than the preset bit is filled to adjust each data block is the data block with the preset bit.

When executing on the data processing device, the computer program product is also suitable for executing the initialized program in following method steps: whether or not the file to be detected is the malicious file is judged based on the Hash eigenvalue of the at least one header file block and the Hash eigenvalue unrelated to the order of each subfile, including: the length of the file to be detected is obtained. Matching query is performed in a preset database according to the length of the file to be detected, the Hash eigenvalue of the header file block and the Hash eigenvalue unrelated to the order of each subfile to determine whether or not the file to be detected is the malicious file.

When executing on the data processing device, the computer program product is also suitable for executing the initialized program in following method steps: the matching query is performed in the preset database according to the length of the file to be detected, the Hash eigenvalue of the header file block and the Hash eigenvalue unrelated to the order of each subfile to determine whether or not the file to be detected is the malicious file, including: when the length, the Hash eigenvalue of the header file block and the Hash eigenvalue unrelated to the order of each subfile of data information stored in the preset database are the same as the file to be detected, the file to be detected is determined as the malicious file.

When executing on the data processing device, the computer program product is also suitable for executing the initialized program in following method steps: before judging whether or not the plurality of file blocks received meet the preset condition, the method further includes: the size of the file to be detected is judged. When the size of the file to be detected exceeds a preset size, a step of judging whether or not the plurality of file blocks received meet the preset condition is executed.

When executing on the data processing device, the computer program product is also suitable for executing the initialized program in following method steps: the method is applied to a scene that the data block of the file to be detected is obtained in application layer protocol disordered transmission of a network security device.

Those skilled in the art may understand that embodiments of this application may be provided as methods, systems, or computer program products. Therefore, this application may adopt forms of complete hardware embodiments, complete software embodiments or embodiments integrating software and hardware. Moreover, this application may adopt the form of a computer program product implemented on one or more computer available storage media (including but not limited to a disk memory, a Compact Disc Read Only Memory (CD-ROM), an optical memory, etc.) containing computer available program codes.

This application is described with reference to flowcharts and/or block diagrams of the method, the device (system) and the computer program product according to the embodiments of this application. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

In a typical configuration, a computing device includes one or more than one Central Processing Unit (CPU), input/output interface, network interface, and memory.

The memory may include a volatile memory, a RAM and/or a nonvolatile memory, and other forms in computer readable media, for example, a ROM or a flash RAM. The memory is an example of the computer readable media.

The computer readable media include permanent and non-permanent, movable and non-movable media that can realize information storage by a variety of ways or technologies. The information may be computer-readable instructions, data structures, modules of a program, or other data. Examples of the computer storage media include: a Phase-Change Memory (PRAM), a Static Random Access Memory (SRAM), a Dynamic Random Access Memory (DRAM), other types of RAM, ROM, and Electrically Erasable Programmable Read-Only Memory (EEPROM), a flash memory or other memory technologies, a CD-ROM, a Digital Video Disk (DVD) or other optical memories and magnetic cassette tapes, magnetic tape disk storage or other magnetic storage devices or a variety of other non-transmission media, which may be configured to store information that can be accessed by the computing device. As defined in the specification, the computer readable media do not include computer-readable transitory media, such as modulated data signals and carriers.

It should be noted that terms "include" and "contain" or any other variant are intended to cover nonexclusive inclusions herein, so that a process, method, goods or device including a series of elements not only includes those elements but also includes other elements which are not clearly listed or further includes elements intrinsic to the process, the method, the goods or the device. Under the condition of no more limitations, an element defined by the statement "including a/an . . . " does not exclude existence of the same other elements in a process, method, goods or device including the element.

Those skilled in the art may understand that embodiments of this application may be provided as methods, systems, or computer program products. Therefore, this application may adopt forms of complete hardware embodiments, complete software embodiments or embodiments integrating software and hardware. Moreover, this application may adopt the form of a computer program product implemented on one or more computer available storage media (including but not limited to a disk memory, a Compact Disc Read Only Memory (CD-ROM), an optical memory, etc.) containing computer available program codes.

The above is only preferred embodiments of the disclosure and is not intended to limit this application. Those skilled in the art may make various modifications and variations. Any modifications, equivalent replacements, improvements and the like made within the spirit and principle of this application shall fall within the scope of protection of this application.

What claimed is:

1. A method for determining a malicious file, comprising:
    judging, by a processor, whether a plurality of file blocks received meet a preset condition, wherein the plurality of file blocks are file blocks of a file to be detected, and the preset condition at least comprises: a size condition of each of the plurality of file blocks and a sorting condition of each of the plurality of file blocks;
    calculating, by the processor, a Hash eigenvalue of at least one header file block when the plurality of file blocks do not meet the preset condition, wherein the at least one header file block is at least one file block cached in a device cache area according to the order of the file blocks;
    dividing, by the processor, the plurality of file blocks into subfiles with a preset quantity, and calculating the Hash eigenvalue unrelated to the order of each subfile; and
    judging, by the processor, whether or not the file to be detected is the malicious file based on the Hash eigenvalue of the at least one header file block and the Hash eigenvalue unrelated to the order of each subfile.

2. The method as claimed in claim 1, wherein calculating the Hash eigenvalue unrelated to the order of each subfile, comprising:
    dividing, by the processor, each subfile into a plurality of data blocks with preset bit, and calculating the Hash eigenvalue unrelated to the order in each data block with the preset bit; and
    accumulating, by the processor, and calculating the Hash eigenvalue unrelated to the order in each data block with the preset bit to obtain the Hash eigenvalue unrelated to the order of each subfile.

3. The method as claimed in claim 2, wherein further comprising:
    filling, by the processor, the data block with less bit than the preset bit when the size of the data block less than the preset bit exists in the data divided by each subfile to adjust each data block to be the data block with the preset bit.

4. The method as claimed in claim 1, wherein judging whether or not the file to be detected is the malicious file based on the Hash eigenvalue of the at least one header file block and the Hash eigenvalue unrelated to the order of each subfile, comprising:
    obtaining, by the processor, the length of the file to be detected; and
    performing, by the processor, matching query in a preset database according to the length of the file to be detected, the Hash eigenvalue of the header file block and the Hash eigenvalue unrelated to the order of each subfile to determine whether or not the file to be detected is the malicious file.

5. The method as claimed in claim 4, wherein performing matching query in a preset database according to the length of the file to be detected, the Hash eigenvalue of the header file block and the Hash eigenvalue unrelated to the order of each subfile to determine whether or not the file to be detected is the malicious file, comprising:
    determining, by the processor, that the file to be detected as the malicious file when the length, the Hash eigenvalue of the header file block and the Hash eigenvalue unrelated to the order of each subfile of the data information stored in the preset database are the same as the file to be detected.

6. The method as claimed in claim 1, wherein before judging whether the plurality of file blocks received meet the preset condition, the method further comprising:

judging, by the processor, the size of the file to be detected; and executing, by the processor, a step of judging whether or not the plurality of file blocks received meet the preset condition when the size of the file to be detected exceeds a preset size.

7. The method as claimed in claim 1, wherein the method is applied to a scene that the data block of the file to be detected is obtained in application layer protocol disordered transmission of a network security device.

8. A device for determining a malicious file, a hardware processor coupled with a memory and configured to execute program units stored on the memory, wherein the program units comprising:

a first judgment unit, which is configured to judge whether a plurality of file blocks received meet a preset condition, wherein the plurality of file blocks are file blocks of a file to be detected, and the preset condition at least comprises: a size condition of each of the plurality of file blocks and a sorting condition of each of the plurality of file blocks;

a first calculation unit, which is configured to calculate a Hash eigenvalue of at least one header file block in a case that the plurality of file blocks do not meet the preset condition, wherein the at least one header file block is a file block cached in a device cache area according to the order of the file blocks;

a second calculation unit, which is configured to divide the plurality of file blocks into subfiles with a preset quantity, and calculate the Hash eigenvalue unrelated to the order of each subfile; and a second judgment unit, which is configured to judge whether or not the file to be detected is the malicious file based on the Hash eigenvalue of the at least one header file block and the Hash eigenvalue unrelated to the order of each subfile.

9. A processor, which is configured to run a program, comprises a memory, wherein when the program is executed by the processor, it causes the processor to execute following steps:

judge whether a plurality of file blocks received meet a preset condition, wherein the plurality of file blocks are file blocks of a file to be detected, and the preset condition at least comprises: a size condition of each of the plurality of file blocks and a sorting condition of each of the plurality of file blocks;

calculate a Hash eigenvalue of at least one header file block when the plurality of file blocks do not meet the preset condition, wherein the at least one header file block is at least one file block cached in a device cache area according to the order of the file blocks;

divide the plurality of file blocks into subfiles with a preset quantity, and calculating the Hash eigenvalue unrelated to the order of each subfile;

judge whether or not the file to be detected is the malicious file based on the Hash eigenvalue of the at least one header file block and the Hash eigenvalue unrelated to the order of each subfile.

10. The processor as claimed in claim 9, wherein when the program is executed by the processor, it causes the processor to execute following steps:

divide each subfile into a plurality of data blocks with preset bit, and calculating the Hash eigenvalue unrelated to the order in each data block with the preset bit; and accumulate and calculate the Hash eigenvalue unrelated to the order in each data block with the preset bit to obtain the Hash eigenvalue unrelated to the order of each subfile.

11. The processor as claimed in claim 10, wherein when the program is executed by the processor, cause the processor to execute following steps:

fill the data block with less bit than the preset bit when the size of the data block less than the preset bit exists in the data divided by each subfile to adjust each data block to be the data block with the preset bit.

12. The processor as claimed in claim 9, wherein when the program is executed by the processor, it causes the processor to execute following steps:

obtain the length of the file to be detected; and perform matching query in a preset database according to the length of the file to be detected, the Hash eigenvalue of the header file block and the Hash eigenvalue unrelated to the order of each subfile to determine whether or not the file to be detected is the malicious file.

13. The processor as claimed in claim 12, wherein when the program is executed by the processor, it causes the processor to execute following steps:

determine that the file to be detected as the malicious file when the length, the Hash eigenvalue of the header file block and the Hash eigenvalue unrelated to the order of each subfile of the data information stored in the preset database are the same as the file to be detected.

14. The processor as claimed in claim 9, wherein when the program is executed by the processor, it causes the processor to execute following a steps:

judge the size of the file to be detected; and execute a step of judging whether or not the plurality of file blocks received meet the preset condition when the size of the file to be detected exceeds a preset size.

15. The processor as claimed in claim 9, wherein the processor is applied to a scene that the data block of the file to be detected is obtained in application layer protocol disordered transmission of a network security device.

* * * * *